United States Patent
Vossiek et al.

(10) Patent No.: US 6,278,398 B1
(45) Date of Patent: Aug. 21, 2001

(54) SENSOR SYSTEM OPERATING METHOD AND A SENSOR SYSTEM

(75) Inventors: Martin Vossiek, München; Patric Heide, Neubiberg, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/380,197

(22) PCT Filed: Feb. 25, 1998

(86) PCT No.: PCT/DE98/00559

§ 371 Date: Aug. 27, 1999

§ 102(e) Date: Aug. 27, 1999

(87) PCT Pub. No.: WO98/38524

PCT Pub. Date: Sep. 3, 1998

(30) Foreign Application Priority Data

Feb. 28, 1997  (DE) .............................................. 197 08 239

(51) Int. Cl.[7] ............................. G01S 13/32; G01S 13/08
(52) U.S. Cl. ...................... 342/128; 342/118; 342/134; 342/135; 342/159; 342/175; 342/195; 342/196
(58) Field of Search ................................. 342/21, 22, 27, 342/28, 118–144, 175, 195, 202, 159, 196, 200, 201

(56) References Cited

U.S. PATENT DOCUMENTS

| 4,539,565 | 9/1985 | Norsworthy . |
| 5,172,123 | 12/1992 | Johnson . |
| 5,189,427 | * 2/1993 | Stove et al. ........................ 342/128 |

FOREIGN PATENT DOCUMENTS

| 27 10 841 | 9/1977 | (DE) . |
| 0 466 258 A2 | 1/1992 | (EP) . |
| 2 165 425A | 4/1986 | (GB) . |
| WO 97/09637 | 3/1997 | (WO) . |

OTHER PUBLICATIONS

Meinke et al., "Taschenbuch Der Hochfrequenztechnik", 5th Edition, Springer–Verlag, Berlin, pp. S3–S4.

Vossiek et al., "Novel FMCW Radar System Concept With Adaptive Compensation of Phase Error", 26th European Microwave Conference, Prague 1996, pp. 135–139.

* cited by examiner

Primary Examiner—Bernarr E. Gregory
(74) Attorney, Agent, or Firm—Bell, Boyd & Lloyd LLC

(57) ABSTRACT

A method in which a sensor system with a frequency-modulated signal source an a delay line for generating a time-delay reference signal is implemented. Phase errors are compensated by correcting the modulation (pre-equalization derived from the reference signal. Signals with a long running time are measured and additionally compensated by a computational, subsequent elimination (post-equalization). A high-pass filter is provided to that end.

9 Claims, 3 Drawing Sheets

SENSOR SYSTEM OPERATING METHOD AND A SENSOR SYSTEM

BACKGROUND OF THE INVENTION

FIELD OF INVENTION

The present invention relates generally to a sensor system and method for operating such a system. More particularly, the invention relates to a sensor system having systematic and stochastic phase errors.

Meinke, Gundlach, Taschenbuch der Hochfrequenztechnik, 5$^{th}$ Edition, Springer Verlag, pp. S3–S4, describes an FMCW radar as distance or velocity sensor. The abbreviation FM stands for frequency modulation and CW stands for continuous wave. A signal source generates a frequency-modulated signal that propagates wave-shaped. The signal source includes, a microwave oscillator and a modulator. The preferably linear frequency-modulated signal is beamed out by an antenna and reflected a subject under test. The received signal is mixed in a mixer with the transmission signal present at the moment. The difference frequency that derives is a criterion for the distance of the subject under test from the antenna. A monostatic or a bistatic antenna arrangement can be utilized for transmitting and receiving the frequency modulated signal In. Given the monostatic arrangement, the transmission signal and the reception signal are beamed out or, received by the common transmission and reception antenna. The transmission signal is separated from the mixer with a circulator or directional coupler and the reception signal separated from the signal source is conducted to the mixer. In the bistatic antenna arrangement, separate transmission and reception antennas are provided. A sensor system in which a high-precision frequency modulation is generated with a control loop that has a delay element is disclosed by German Document No. 27 10 841 A1.

FIG. 3 shows a known sensor system with a delay line for generating a reference signal. The signal source MO is shown supplying a signal that propagates wave-shaped and that is frequency-modulated. The signal is preferably linearly modulated. The transmission signal s(t) is supplied to a transmission and reception diplexer SEW that, for example, can be a circulator or a directional coupler. From this diplexer, the transmission signal proceeds into the transmission and reception unit SEE that has one or more antennas available to it for emitting and for receiving the microwave signal. After the transmission signal has been emitted and reflected from a target, it is supplied from the transmission and reception means to a mixer means EMIX as reception signal r(t) via the transmission and reception diplexer, the reception signal being mixed with the transmission signal s(t) in the mixer to form the measured signal mess(t). Subsequently, disturbing high-frequency mix components are eliminated from the measured signal, preferably in a low-pass filter TP.

The transmission signal s(t) coming from the signal source MO is delayed with a delay means V. The signal delayed by $\tau_{ref}$ is mixed with the transmission signal s(t) in a further mixer means REFMIX to form the reference signal ref(t) that is then preferably conducted through a low-pass filter. The measured signal mess(t) and the reference signal ref(t) are supplied to an evaluation means AE.

FIG. 4 shows the corresponding sensor system to FIG. 3 with a bistatic antenna arrangement. In this system the transmission and reception diplexer is eliminated. The transmission and reception arrangement is two separate antennas for transmission and reception.

German Document No. 195 33 124 discloses an apparatus for distance measurement with a signal source that comprises a modulator and a voltage-controlled oscillator. The oscillator generates a frequency-modulated signal. Generally, the modulation is not ideally linear. The transmission signal s(t) is emitted by the antenna, reflected at the target and received. In a first mixer, the signal r(t)~s(t-$\tau_{mess}$) received after the time $\tau_{mess\ is}$ mixed with the current transmission signal.

This branch of the apparatus serving as measuring means, referred to below as MES, has a reference means, referred to below as REF, coordinated with it. This REF is supplied with the frequency-modulated signal generated by the signal source. The REF contains a surface wave component that forwards the frequency-modulated signal to a second mixer delayed by the time duration $\tau_{ref}$. This mixer generates the reference signal ref(t). The low-pass filtered signals mess (t) and ref(t) are supplied to an evaluation unit.

As already presented, the fundamental FMCW principle is present when a linearly frequency-modulated signal s(t) is emitted and the echo signals r(t) reflected by the target and received are mixed back with the transmission signal s(t). T is the duration of the sweep event with t∈[0,T]. Due to the time delay $\tau_{mess}$ that the echo signals exhibit compared to the transmission signal, a constant frequency $f_{Figure}$ proportional to the distance or, a linearly rising phase swing arises as mix product given a linear sweep. Given a non-linear sweep, clear deviations from these ideal conditions are present.

It is assumed in the consideration of a non-linear sweep that the linear sweep with the basic radian frequency $\omega_o$ and a sweep rate $\mu$ of $$\mu = 2 \cdot \pi \frac{df}{dt}$$

deviates from an ideal phase linearity with a phase error $\Delta\phi$, i.e.:

$$s(t) = \cos\left[\left(\omega_0 + \frac{\mu \cdot t}{2}\right) \cdot t + \Delta\phi(t)\right] \text{ and}$$

$$r(t) = \cos\left[\left(\omega_0 + \frac{\mu \cdot (t+\tau)}{2}\right) \cdot (t+\tau) + \Delta\phi(t+\tau)\right]$$

Leaving higher mix products and constant phase amounts out of consideration, the mix product of s(t) and r(t) thus derives:

$$mess(t) = \cos\left[\mu \cdot \tau \cdot t + \Delta\phi(t+\tau) - \Delta\phi(t)\right].$$

It is assumed in the consideration of the error that the phase errors in the interval τ can be assumed as linear changes. Under this pre-condition, the ideal signal frequency $$f_i = \frac{\mu \cdot \tau}{2 \cdot \pi}$$

is respectively distorted at time t by the noise term $$\Delta\Phi(t, \tau) = \tau \cdot \frac{d}{dt}[\Delta\phi(t)]$$

linearized by t. Given a non-linear sweep, the signal frequency is no longer constant but distributed over a broad frequency range. The noise effects rise proportionally with the signal running time and, thus, proportionally with the measurement distance.

When the time-dependent noise term $\Delta\Phi(t,\tau)_{ref}$ for an arbitrary reference distance $s_{ref}$ (with the appertaining signal running time $\tau_{ref}$) is known, for example from a reference measurement, then the phase errors for arbitrary measurement distances $s_{mess}$ (with the appertaining signal running time $s_{mess}$) can also be derived therefrom according to $$\Delta\Phi(t, \tau)_{mess} = \Delta\Phi(t, \tau)_{ref} \cdot \frac{\tau_{mess}}{\tau_{ref}}$$

It follows from the preceding presentation that the momentary phase $\phi(t)$ of the signal is proportional to the measurement distance or, respectively, to the signal running time. Thus:

$$\phi_{mess}(t) = \phi_{ref}(t) \cdot \frac{\tau_{mess}}{\tau_{ref}}.$$

German Document No. 195 33 124 and the publication of Vossiek et al., "Novel FMCW radar system concept with adaptive compensation of phase errors", 26th European Microwave Conference, Prague, Czech Republic, Sep., 9–12 1996, pp. 135–139, disclose various methods of how a distorted signal can be distortion-corrected such given a known phase curve that the phase errors are corrected.

One possibility of signal equalization is comprised in sampling the measured signal not in constant time intervals, as usual, but in constant phase intervals (preferably zero-axis crossings, i.e. phases spaced at 180° relative to one another). The measured signal is thereby sampled at times $t_n$ at which the phase of the reference signal $\phi_{ref}$ has changed by a multiple of a predetermined phase step width $n \cdot d\phi_{ref}$, i.e.

$$mess'(n \cdot dt') = mess(t_n = t|_{\phi_{ref}(t) = n \cdot d\phi_{ref}}).$$

In order to determine the new, corrected measured signal mess'(n ·dt'), the sampling points acquired in this way are sequentially arranged in the time sampling interval dt'. The sampling interval dt' is calculated from $d\phi_{ref}$, $s_{ref}$ and the sweep rate $\mu$. This linearization or, equalization method is called post-equalization below.

Another linearization method includes calculating a corrected modulation signal on the basis of the phase errors measured in the reference unit. This linearization or, equalization method is called pre-equalization below. Phase errors in the following sweeps can be corrected by driving the oscillator with the modified control signal, however only those phase errors that occur systematically, i.e. temporally reproducible. Stochastic phase errors (principally the phase noise of the oscillator) are not corrected by this method. However, the stochastic phase errors are often highly disturbing, especially given signals with a long running time (i.e. given distance sensors with targets at a great distance).

When target and sensor move relative to one another, then the distance-dependent frequency $f_{dist}$ of the measured signal has an additional Doppler frequency $f_{dop}$ superimposed on it. The signal spectrum of mess (t) is thus shifted by the Doppler frequency $f_{dop}$ in this case. The Doppler frequency is calculated according to:

$$f_{dop} = \frac{2 \cdot v}{\lambda},$$

whereby v represents the subject velocity and $\lambda$ represents the wavelength of the measured signal.

Since the reference path no longer correctly describes the real measurement path, the signal of the post-equalization method no longer ensues ideally in this case. Errors mainly occur given short signal running times since the distance-dependent frequencies are relatively small compared to the Doppler frequency. When the Doppler frequency is high compared to distance-dependent frequencies, the error in the signal equalization due to the Doppler shift is negligible or, it is assured that the proposed signal equalization leads to an improvement of the measured result.

SUMMARY OF THE INVENTION

An object of the present invention is to specify a method for use in one of the above-described sensor systems with which a more effective compensation of systematic and stochastic phase errors is achieved in all signal running time ranges given existing Doppler frequency shifts. A modified embodiment of such a sensor system suitable therefore should also be recited.

To this end, in an embodiment of the present invention, a method for operating a sensor system includes generating a frequency modulated propagating wave-shaped signal as a generated signal; beaming out the generated signal and receiving a part of the signal reflected by a target as a received signal; mixing the received signal with the generated signal to form a measured signal; mixing the generated signal with a signal delayed in time relative thereto to form a reference signal; identifying phase errors that occur in the generated signal or in the received signal upon employment of the reference signal; dividing the measured signal into a lower-frequency part and a higher-frequency part; correcting existing phase errors from the higher-frequency part of the measured signal and the reference signal; and evaluating the lower-frequency part of the measured signal and the corrected higher-frequency part of the measured signal.

In an embodiment, the method includes diminishing systematic phase errors present in the generated signal by correcting the modulation of the signal.

In an embodiment, the step of correcting the modulation of the signal also includes measuring the corrections of the modulation of the signal and considering the corrections in every step for further improvement of each correction.

In an embodiment, the step of correcting the modulation of the signal includes averaging a plurality of measurements of the reference signal.

In an embodiment, the step of dividing the measured signal ensues at a limit frequency that corresponds to a highest Doppler frequency predetermined for a measurement.

In an embodiment, the step of generating a frequency-modulated signal further includes selecting a duration and a rate of a sweep of the frequency such that stochastic phase errors for running times of the measured signal have at most negligibly slight influence on a measured result at distance-dependent frequencies of the measured signal lower than a predetermined value of a Doppler frequency.

In another embodiment of present invention, a sensor system includes a signal source to generate a frequency-modulated signal that propagates wave-shaped; transmission and reception means and mixer means are provided downstream from the signal source; mixer means arranged such that a signal coming from the transmission and reception means is mixed with the signal generated by the signal source to form a measured signal; delay means for generating a reference signal from the signal coming from the signal source that is delayed in time relative thereto; evaluation means for receiving the measured signal and the reference signal; and a high-pass filter eliminates lower-frequency parts of the measured signal resulting from measurements in a predetermined running time range and allows the higher-frequency parts of the measured signal to pass that result from measurements in a range of higher signal running times.

In an embodiment, the evaluation means generates a correction signal for correcting the modulation of the signal source from one of the reference signal, and the reference signal and the measured signal; and the evaluation is configured for determining correction of a measured value required due to occurring phase errors from the reference signal and from a part of the measured signal that comprises higher frequencies present in the measured signal.

In an embodiment, the sensor further includes a phase step discriminator and a counter being positioned between the delay means and the evaluation means; and a first analog-to-digital converter that is pulse-controlled by the phase step discriminator and, arranged parallel thereto, a second analog-to-digital converter provided with a low-pass filter, the first and second analog-to-digital converter are positioned between the mixer means for generating the measured signal and the evaluation means.

A separate correction of phase errors in the measured signals with high and low frequency, i.e. the signal components with long or, short signal running time, is undertaken with the invention. To that end, first, the reference signal is employed in order to undertake a correction of the modulation of the signal generated by the signal source, if necessary. This correction ensues via a control signal k(t) communicated from the evaluation means AE to the signal source MO. This control signal is generated, for example, in that the points in time at which the reference signal exhibits a defined phase and the spacings of these points in time from one another are determined and subsequently employed for retuning the signal source. When no disturbing systematic phase errors occur in the modulation of the transmission signal or if these phase errors can be eliminated to an adequate extent with the post-equalization of the measured signal described below, this systematic correction (pre-equalization) of the modulation of the transmission signal can be omitted.

Second, a post-equalization of the measured signal components that belong to signals with a long running time is undertaken. This occurs, for example, in a way disclosed by German Document No. 195 33 124 and described in the Background of the Invention. A lower-frequency part of the measured signal is preferably first eliminated in a high-pass filter. The measured signal is then stored in digitalized form, for example at all points in time at which the reference signal exhibits a defined phase, for example a zero-axis crossing. These values of the measured signal are then evaluated independently of the faulty fluctuations of the phase that are produced by the signal source or other components of the apparatus. The evaluated measured result therefore corresponds to a measurement with, for example, ideally linearly frequency-modulated signal.

DETAIL DESCRIPTION OF THE PREFERRED EMBODIMENTS

Figure 1:
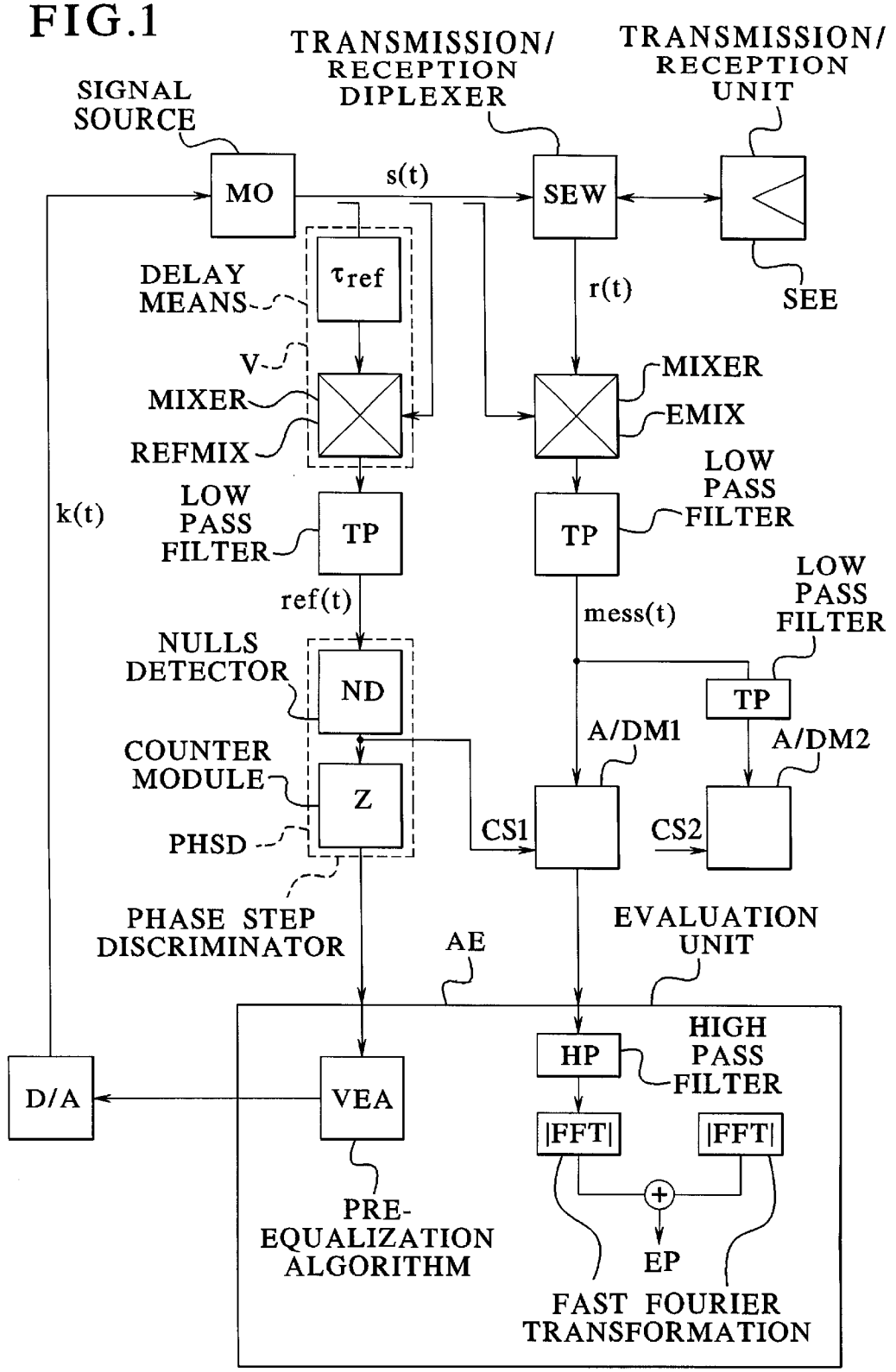
FIG. 1 shows a block circuit diagram of a sensor system according to the invention.

In the arrangement shown as an example in FIG. 1, the phase step discriminator PHSD serves the purpose of detecting the points in time of the passing of constant phase intervals in the reference signal. The nulls of the reference signal are preferably identified as constant phase intervals with a nulls detector ND. The phase step discriminator PHSD generates a trigger signal CS1 that controls a counter module Z, so that the time intervals that lie between two phase steps (preferably two nulls) can be measured. The counter readings acquired in this way are read in by the evaluation unit AE, which preferably contains a microprocessor or signal processor. Based on these measured values, a new control signal k(t) is calculated in the pre-equalization algorithm VEA and is output via a digital-to-analog converter D/A, so that the systematic phase errors of the frequency-modulated signal s(t) are compensated and a linear frequency modulation of s(t) derives, except for stochastic phase errors.

When the measured time between two trigger pulses of CS1 is greater than the anticipated time (that is determined by the sweep rate and the dimensioning of the delay line), the slope of the time-frequency line in the sweep (passage of the modulation from the lowest to the highest frequency or vice versa) must be increased. When the spacing of the zero-axis crossings of the reference signal is too small, the slope of the time-frequency line of the modulation is lowered. As a result, the frequency of the reference signal is raised or, lowered.

A control signal for the correction of the modulation for the $n^{th}$ measurement can preferably be derived from the reference signals ref(t) of a plurality of preceding measurements (for example, the immediately preceding L measurements n-L through n-1). In particular, this control signal can always be derived in sliding fashion from the same plurality (L) of immediately preceding measurements. What an averaging of the measured phase errors can achieve is that determinant systematic phase errors are taken into consideration in the correction and disturbing and stochastically distributed phase errors are averaged out. The frequency modulation can be corrected as intended by converting the acquired values of the phase errors into suitable values of a drive voltage for the signal source.

Advantageously, the pre-equalized modulation signal can also be adaptively determined via an iteration procedure. The modulation of the transmission signal of a respectively new measurement derives from the modulation of the transmission signal in the preceding measurement and taking into consideration a calculated, correction based on the measured phase errors. The iteration successively diminishes the deviation of the time intervals of two phase steps, for example zero-axis crossings, from the rated values. The iteration procedure is repeated until all deviations of the time intervals from the required values lie below a predetermined limit in terms of value. This limit is dependent on the selection of the processing time and on the measuring precision.

The trigger signal CS1 also serves the purpose of starting the analog-to-digital conversion with the converter A/DM1. As a result of this type of triggering, the measured signal mess(t), as mentioned above in the Background of the Invention, is post-equalized, i.e. the stochastic phase errors are minimized. In order to suppress the signal components of the near range, which are not correctly equalized by this type of post-equalization given existing, greater Doppler shifts, the digitalized signal is subsequently high-pass-filtered.

Parallel to the described signal branch, the measured signal mess(t) is digitalized with a constant sampling rate by a second A/D converter A/DM2. The signal is low-pass filtered before the digitalization in order to suppress the signal components of the far range and assure adherence to the sampling theorem. The sampling triggering CS2 is preferably selected such that approximately just as many trigger events derive over an entire sweep as given CS1. It is thereby assured that the effective sampling rate [sic] in the high-pass and low-pass-filtered signal branch are the same and identical frequency intervals thus derive in the FFT evaluation (Fast Fourier Transformation). The acquired spectra for the short and long signal running times can thus easily be combined to a uniform echo profile EP for the entire evaluation range. The limit frequencies of high-pass and low-pass are preferably selected equal to the highest Doppler frequency to be anticipated in the measured signal.

For optimum functioning of the method, the frequency of the transmission signal, the sweep duration T and the sweep rate $\mu$ are to be selected such that the stochastic phase errors of the oscillator only take on a disturbing form when measuring such a great distance that it is assured that the distance-dependent frequencies of the measured signal are higher than the highest Doppler frequencies to be expected.

Figure 2:
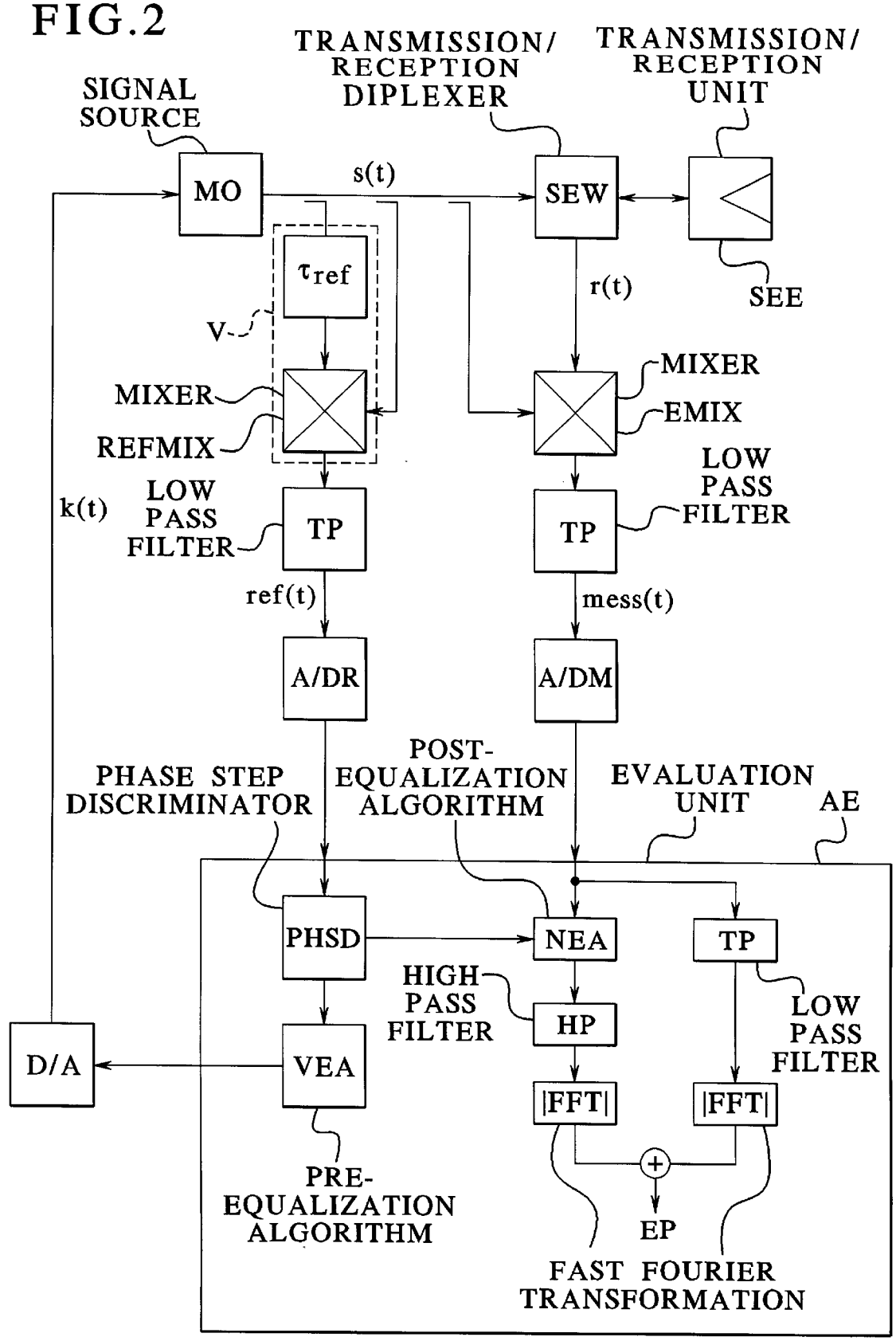
FIG. 2 shows a block circuit diagram of a sensor system according to the invention.
Figure 3:
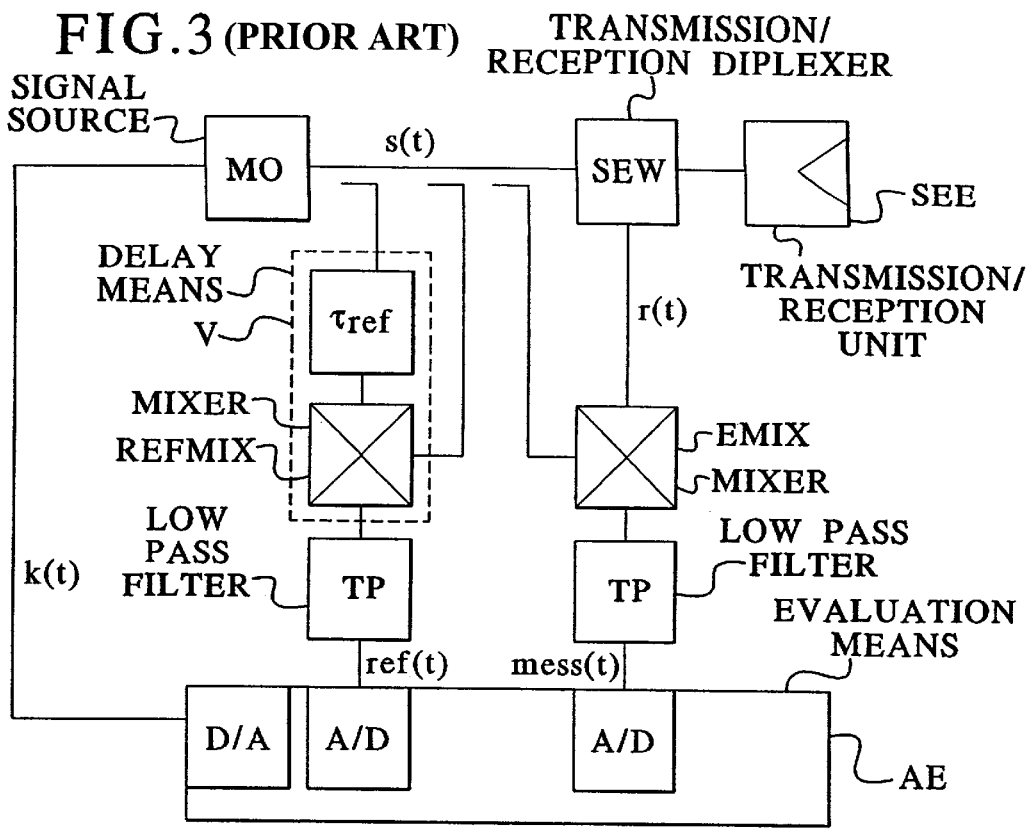
FIG. 3 shows a known sensor system.

FIG. 2 shows another possible embodiment of the inventive sensor concept. The measured signal mess(t) and the reference signal ref(t) are digitalized with a constant sampling rate by the converters A/DM or A/DR and are read into the evaluation unit. The phase step detection PHSD ensues algorithmically here, which is beneficial especially when small phase steps (smaller than $\pi$) are to be detected. As already described, a new modulation signal is calculated from the time intervals of the phase steps. The post-equalization algorithm NEA is preferably implemented as described in Vossiek et al., "Novel FMCW radar system concept with adaptive compensation of phase errors," $26^{th}$ European Microwave Conference, Prague, Czech Republic, Sep., 9–12 1996, pp. 135–139. As already explained for FIG. 1, the division into near and far range ensues only so that all signalling processing steps can be implemented here by software.

As an alternative to fast Fourier transformation, other known frequency analysis methods such as bandpass filter banks or statistical frequency analysis methods can also be implemented. Methods wherein the division of the frequency bands of interest for far and near range known a priori is utilized. As a result thereof, the calculating outlay in the spectral analysis can be minimized.

The disclosed method can also be advantageously employed for frequency-modulated systems that no longer contain any systematic phase errors, either fundamentally or due to suitable devices. This is the case, for example, given systems with direct digital synthesis of the transmission signal. The apparatus for pre-equalization, i.e. for compensating the systematic phase errors, can be omitted here. The separate post-equalization for the signal components with high running time ensues as already described above.

The inventive method applies a correction method for phase errors that is adapted to signal running time and that can also be utilized for measuring rapidly moving subjects in all distance ranges and given employment of signal sources with great phase noise. For example, the signal source is a modulatable microwave oscillator, a light source or an ultrasound generator. After the above-described correction of the modulation of the signal source, systematic phase errors being eliminated therewith, or given a modulation free of systematic phase errors from the very outset, the reception signal mainly contains only stochastic phase errors. Since phase errors of the transmission signal can also be subsequently compensated (post-equalization), such a subsequent correction of the measured signal is applied in the inventive method for the component of a measured signal that belongs to signal components with a high running time. The separation of the measured signal into signal parts with short and long running time ensues by low-pass filtering for the short signal running times for eliminating the signal parts with high running time and by high-pass filtering for the high running times in order to eliminate the signal parts with low running time. The limit of the division is preferably selected at the value of the highest Doppler frequency usually to be anticipated given the intended employment.

Figure 4:
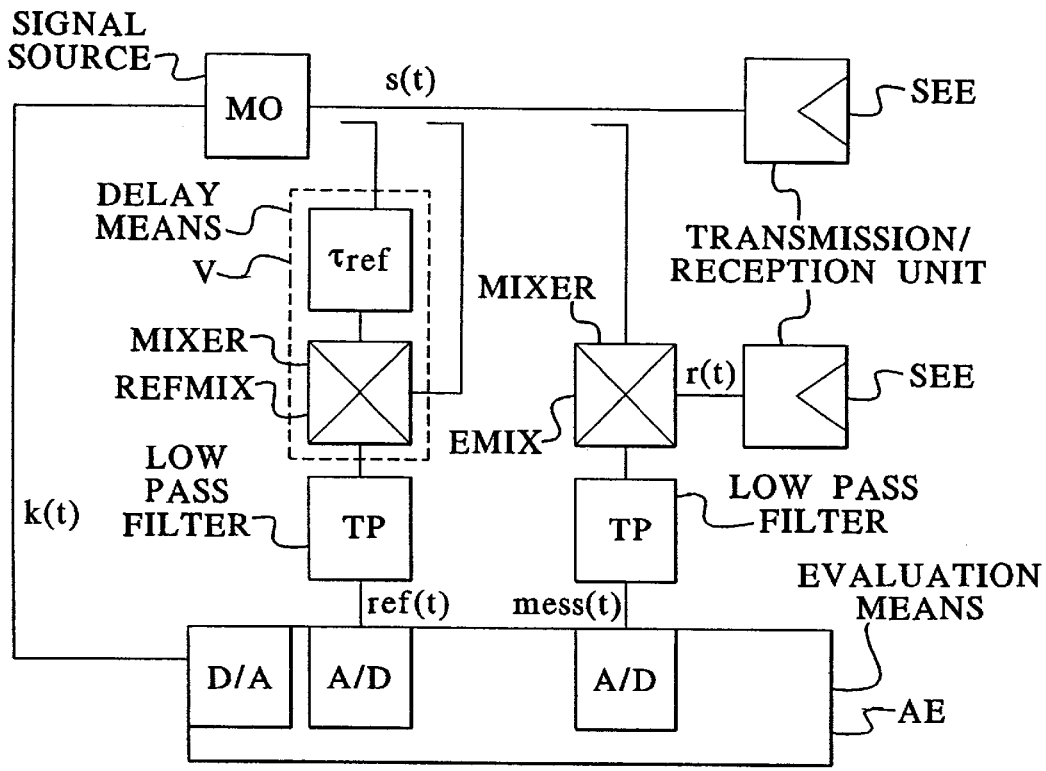
FIG. 4 shows a know sensor system.

The particular advantage of the inventive method is that a separate elimination of phase errors ensues for measurements with short signal running times and measurements with long signal running times. Given sensors for distance measurement, thus, a division of measurements ensues for the near range and measurements for the far range. As a result, more precise results for targets of different distances and velocities than in traditional measuring methods are obtained in an evaluation of the partial measured signals belonging to these ranges. The inventive method can be utilized in radar, lidar (light detection and ranging) and sonar systems (upon employment of ultrasound). In addition to a suitable evaluation means, a traditional sensor system is to be provided with an apparatus for dividing the measured signal into near and far range, for example with the high-pass filter HP shown in FIG. 1. The method can also be utilized upon employment of a bistatic sensor comparable to FIG. 4 modified in the same way. The remaining configuration of the sensor systems is largely at will. In particular, mixing stages, frequency dividers or frequency multipliers can be provided as usual for generating intermediate frequencies or the like that can be processed better.

Although other modifications and changes may be suggested by those skilled in the art, it is the intention of the inventors to embody within the patent warranted hereon all changes and modifications as reasonably and properly come within the scope of their contribution to the art.

What is claimed is:

1. A method for operating a sensor system, comprising the steps of:

generating a frequency-modulated propagating wave-shaped signal as a generated signal;

beaming out the generated signal and receiving a part of the signal reflected by a target as a received signal;

mixing the received signal with the generated signal to form a measured signal;

mixing the generated signal with a signal delayed in time relative thereto to form a reference signal;

identifying phase errors that occur in the generated signal or in the received signal upon employment of the reference signal;

dividing the measured signal into a lower-frequency part and a higher-frequency part;

correcting existing phase errors from the higher-frequency part of the measured signal and from the reference signal; and evaluating the lower-frequency part of the measured signal and the corrected higher-frequency part of the measured signal.

2. The method in claim 1, further comprising the steps of:

diminishing systematic phase errors present in the generated signal by correcting the modulation of the signal.

3. The method in claim 2, wherein the step of correcting the modulation of the signal further comprises the step of:

measuring corrections of the modulation of the signal and considering the corrections in every step for further improvement of each correction.

4. The method in claim 2, wherein the step of correcting the modulation of the signal includes averaging a plurality of measurements of the reference signal.

5. The method in claim 1, wherein the step of dividing the measured signal ensues at a limit frequency that corresponds to a highest Doppler frequency predetermined for a measurement.

6. The method in claim 1, wherein the step of generating a frequency-modulated signal further comprises the steps of:

selecting a duration and a rate of a sweep of the frequency such that stochastic phase errors for running times of the measured signal have at most negligibly slight influence on a measured result at distance-dependent frequencies of the measured signal lower than a predetermined value of a Doppler frequency.

7. A sensor system, comprising:

a signal source generates a frequency-modulated signal that propagates wave-shaped;

transmission and reception means and mixer means are provided downstream from the signal source;

mixer means arranged such that a signal coming from the transmission and reception means is mixed with the signal generated by the signal source to form a measured signal;

delay means for generating a reference signal from the signal coming from the signal source that is delayed in time relative thereto;

evaluation means for receiving the measured signal and the reference signal; and a high-pass filter eliminates lower-frequency parts of the measured signal resulting from measurements in a predetermined running time range and allows the higher-frequency parts of the measured signal to pass a result from measurements in a range of higher signal running times.

8. The sensor in claim 7, wherein the evaluation means generates a correction signal for correcting the modulation of the signal source from one of the reference signal, and the reference signal and the measured signal; and the evaluation is configured for determining correction of a measured value required due to occurring phase errors from the reference signal and from a part of the measured signal that comprises higher frequencies present in the measured signal.

9. The sensor system in claim 7, further comprises:

a phase step discriminator and a counter being positioned between the delay means and the evaluation means; and a first analog-to-digital converter pulse-controlled by the phase step discriminator and, arranged parallel thereto, a second analog-to-digital converter having a low-pass filter, the first and second analog-to-digital converter being positioned between the mixer means for generating the measured signal and the evaluation means.

* * * * *